No. 772,350. PATENTED OCT. 18, 1904.
A. FELLHEIMER.
ELECTRICAL CONDUIT.
APPLICATION FILED OCT. 19, 1901.
NO MODEL. 3 SHEETS—SHEET 1.
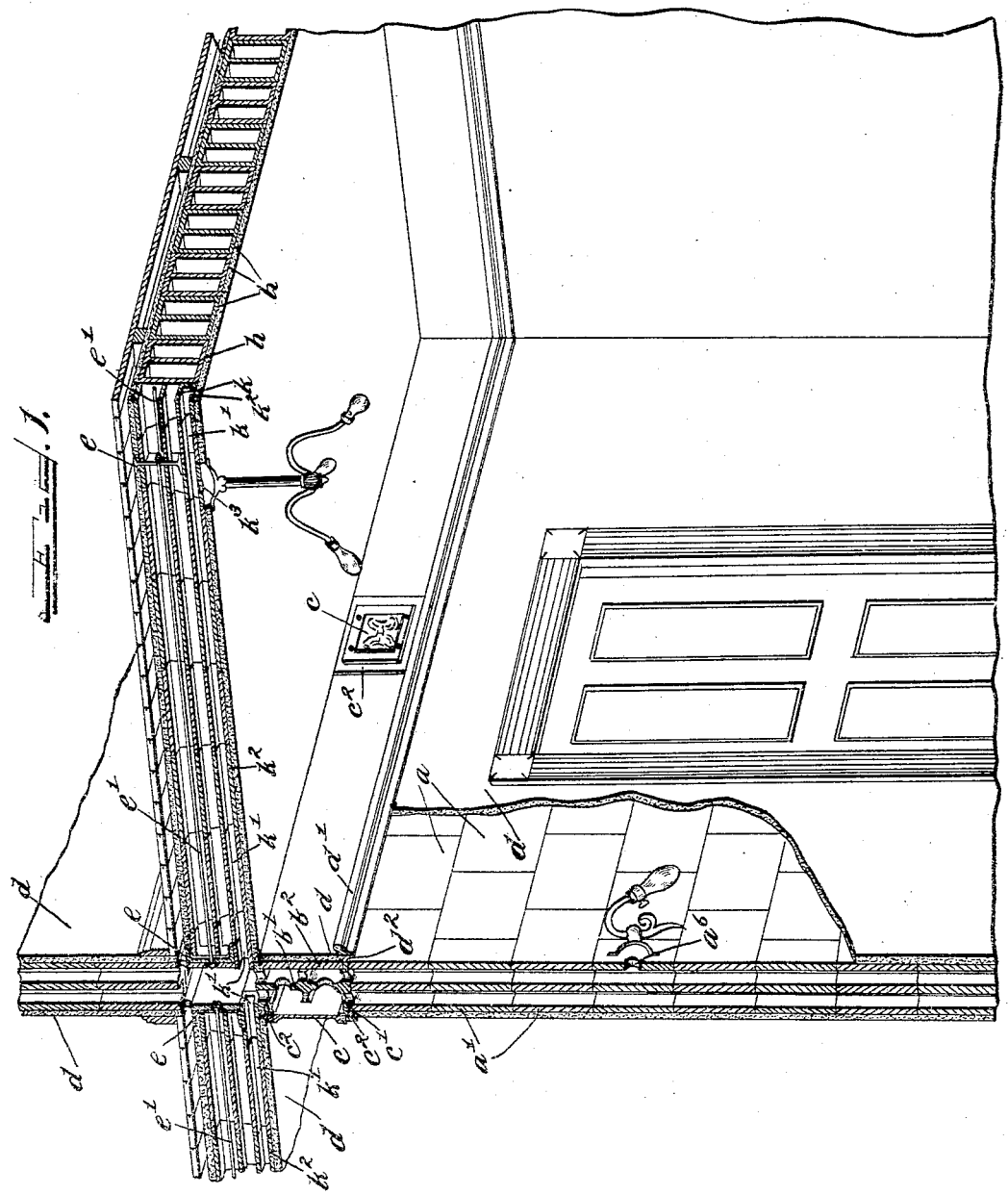

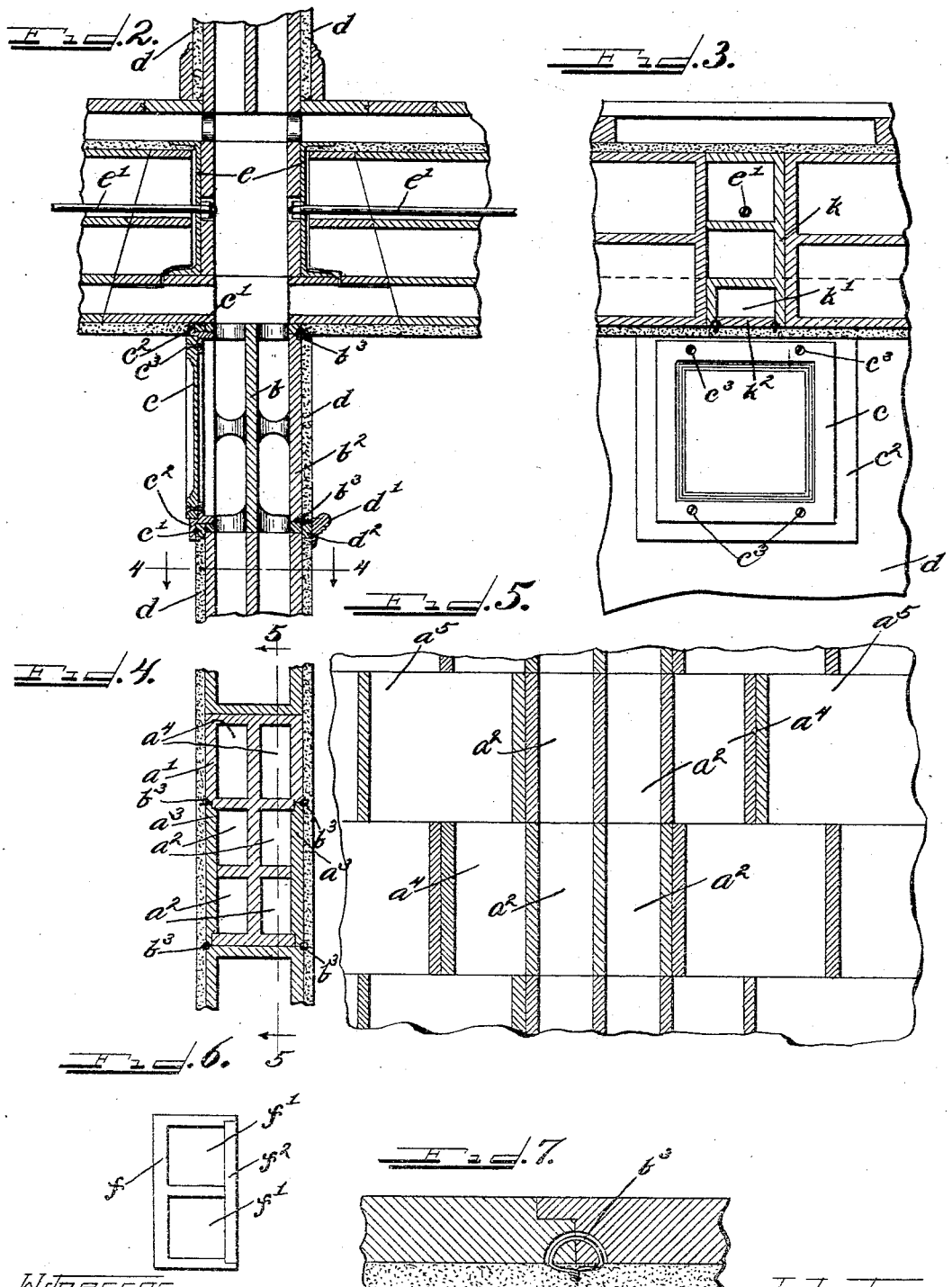

No. 772,350. PATENTED OCT. 18, 1904.
A. FELLHEIMER.
ELECTRICAL CONDUIT.
APPLICATION FILED OCT. 19, 1901.
NO MODEL. 3 SHEETS—SHEET 3.
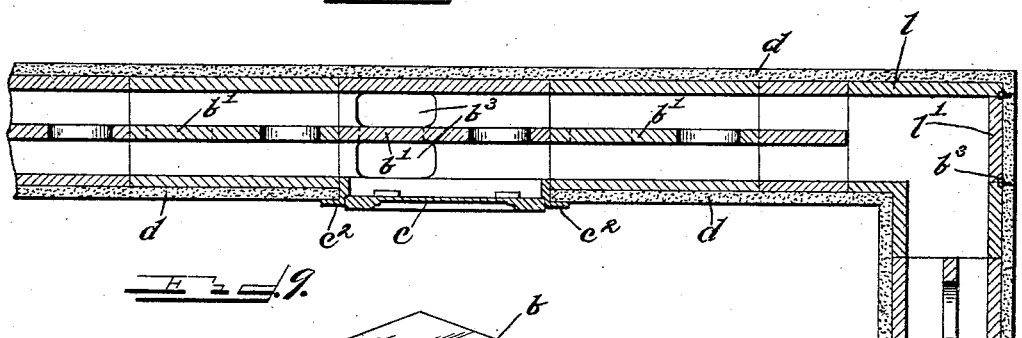
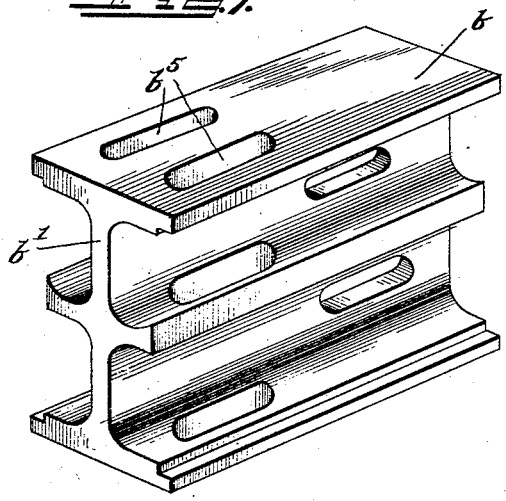
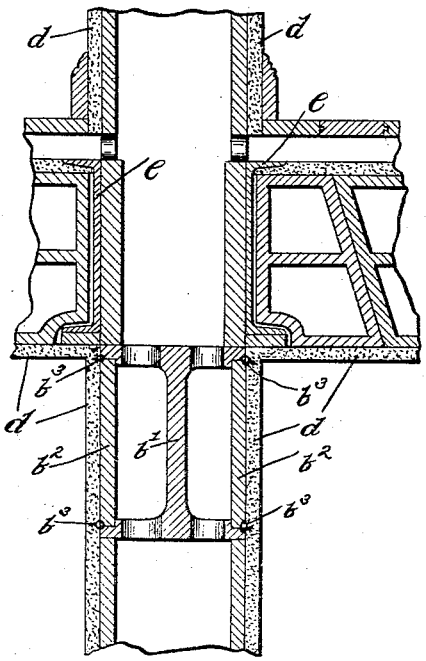
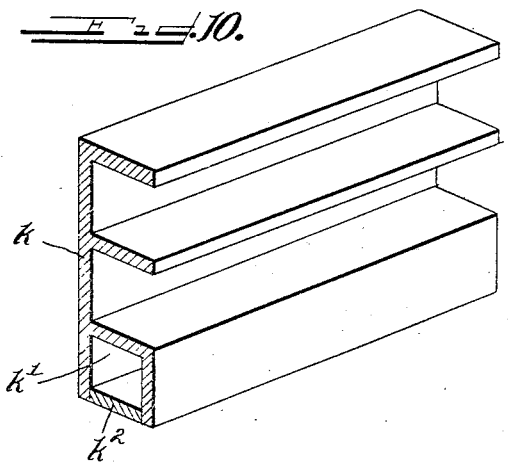
WITNESSES
Ira D. Perry
F. B. Weir
INVENTOR
Alfred Fellheimer
by Jones & Addington
Attys No. 772,350. Patented October 18, 1904.

UNITED STATES PATENT OFFICE.

ALFRED FELLHEIMER, OF CHICAGO, ILLINOIS.

ELECTRICAL CONDUIT.

SPECIFICATION forming part of Letters Patent No. 772,350, dated October 18, 1904.

Application filed October 19, 1901. Serial No. 79,191. (No model.)

*To all whom it may concern:*

Be it known that I, ALFRED FELLHEIMER, a citizen of the United States, residing at Chicago, in the county of Cook and State of Illinois, have invented a certain new and useful Improvement in Electrical Conduits, of which the following is a full, clear, concise, and exact description, reference being had to the accompanying drawings, forming a part of this specification.

My invention relates to an electrical conduit for the reception of electric wires, gas-pipes, &c., my object being to provide a form of conduit which may be built into the walls of a building and which shall be conveniently arranged for the reception of wires, pipes, &c., and so constructed that access to the interior of the conduit may be readily had for the removal of the pipes or wires or for the insertion of new pipes subsequent to the construction of the building.

In buildings as heretofore constructed, particularly those of the fireproof class, the electrical conductors have been carried in moldings usually of wood extending around the wall just beneath the ceiling. These moldings are more or less unsightly and, moreover, are not fireproof, and it is one of the objects of the present invention to dispense with moldings of this class. In carrying electrical conductors along the faces of the walls of fireproof buildings it has been the usual practice to chip or cut away the tile or other material forming the wall to form a channel within which the wires are placed, the plaster being thereafter formed over the wires to hide the same from view.

A further object of the present invention is to provide conduits in the wall for the reception of such vertically-extending wires.

My invention further contemplates means for the reception of wires running along the ceiling for connection with chandeliers or fixtures suspended from the ceiling.

In accordance with my invention I form the conduits directly in the wall during the construction of the building, and by the term "wall" as employed herein it will be understood that I contemplate either the vertical wall or partition of a building or the horizontal wall, such as a ceiling. It is the usual practice in constructing the walls or partitions of buildings, particularly fireproof structures, to employ tile or similar blocks of material adapted to be laid together, and I provide specially-formed tile having conduits formed therein, and these specially-formed tiles are employed for the top layer of the wall—that is, the layer which rests immediately beneath the ceiling. In this manner conduits may be formed extending completely around a room or compartment, and I preferably provide removable covers for the conduits which may be removed to permit access to the interior of the conduit. In the construction of the building the wires or pipes will be placed in the conduits, the cover then placed in position, and thereafter the plaster will be formed over the cover. Manholes may be provided at intervals to permit access to the conduits; but if it be necessary to gain access to the conduit throughout a considerable portion of the length thereof the removable covers may be taken off, and afterward the covers and the plaster may be replaced. To provide for pipes and wires extending vertically—as, for instance, from floor to floor, or down to a bracket or switch, or to a gas-fixture—I provide specially-formed tiles adapted to be formed into the wall and carrying suitable conduits to form continuous openings or passages for the reception of the pipes or wires. Likewise for the ceilings I provide specially-formed tiles carrying openings which constitute conduits extending along the ceiling to the desired localities.

I have illustrated my invention in the accompanying drawings, in which—

Figure 1 is a sectional view of a portion of a building, illustrating my invention. Fig. 2 is a sectional detailed view at the intersection of the partitions and ceiling. Fig. 3 is a sectional view through the ceiling. Fig. 4 is a sectional view on line 4 4, Fig. 2. Fig. 5 is a sectional view on line 5 5, Fig. 4. Fig. 6 is a view of a modified form of tile. Fig. 7 is a view showing the manner in which the removable covers are secured in position. Fig. 8 is a sectional view of a wall built in accordance with my invention. Fig. 9 is a view of one of the specially-formed tiles. Fig. 10 is a view of one of the ceiling-tiles. Fig. 11 is a sectional view at the intersection of the partitions and the ceiling.

Like letters refer to like parts in the several figures.

The vertical wall or partition is shown as built up of the usual tiles or blocks $a\ a$, and associated therewith in the formation of the wall are the specially-formed tiles $a'\ a'$. (Shown in detail in Figs. 4 and 5.) These tiles $a'$ are provided with the openings or ducts $a^2\ a^2$, which constitute conduits for the pipes or conductors. Removable covers $a^3\ a^3$, formed of tile or other material, are adapted to fit against the faces of the tiles to inclose the openings $a^2$. The tiles are provided with end portions $a^4$, and, as shown in Fig. 5, the tiles of the different layers are placed so that the end portions $a^4$ will rest at opposite ends of the tiles, whereby the tiles may overlap the adjoining tiles $a^5\ a^5$, which latter tiles are the usual tiles employed in building construction. By this arrangement continuous conduits or channels $a^2\ a^2$ are provided extending through the wall in a vertical direction. Wherever it is desired to locate a bracket or fixture, an opening $a^6$ may be provided through the wall of the tile for the passage of the pipes or wires. The wall is built up in this manner until it comes to the top layer, which layer is formed of specially-constructed tiles $b$. (Shown in detail in Fig. 9.) This tile is provided with a central web $b'$, and two channels are provided upon each side of this web. A removable cover $b^2$ is provided, adapted to rest one against each face of the tile to inclose the channels and form conduits for the reception of the pipes and wires. Openings $b^5\ b^5$ may be formed to accommodate the passage of the pipes or wires in a direction transverse to the conduits—as, for instance, for the passage of the wires or pipes from the horizontal conduits to the vertical conduits or from the conduit upon one side of the partition to the opposite side of the partition. By means of the tiles $b$ continuous conduits are formed, which may extend completely or partially around the walls of the room, as desired. These conduits should preferably extend completely around the room, and manholes are provided at intervals with suitable covers $c\ c$. These manholes may be formed in any preferred manner; but I preferably surround the manhole-opening with a ground or casing $c'$, of wood, within which casing is secured a frame $c^2$, of metal, having inwardly-extending lugs, to which the cover $c$ is secured by means of screws $c^3\ c^3$ or otherwise. In this manner the cover may be readily secured in position or removed at will. In the construction of the building the tiles $b\ b$ will be placed in position, and after the pipes and wires have been placed in the conduits as desired the covering-slabs $b^2$ will be placed in position against the faces of the tiles and secured by means of wires $b^3\ b^3$, (shown in detail in Fig. 7,) which pass through holes formed, respectively, in the cover and in the tile, the ends of the wires being twisted together to form a secure fastening. The coating of plaster $d$ may then be placed upon the surface of the wall thus formed, the covering being thus hidden from view. I preferably mount the picture-molding $d'$ opposite the lower edge of the cover $b^2$, this molding being secured to the usual ground $d^2$. If for any reason it be desired to remove the covers to gain access to the interior of the conduits, the plaster may be cut at the intersection of the wall with the ceiling and may also be severed from the ground $d^2$ by means of a trowel, and the cover may then be removed, carrying with it the plaster carried thereon. In this manner the covers may be taken off with but slight injury to the plaster, and the covers may then be returned to position, and the crevices formed in the plaster may then be repaired. For purposes of stringing new wires the opening of the manholes will be sufficient; but when occasion requires the disclosing of the conduit throughout the whole or the greater portion of its length the covers may be removed in the manner above described.

The tiles above described are particularly applicable in the formation of the partitions or walls between a hall or corridor and the several rooms or compartments communicating therewith. As conduits are thus formed, both upon the hall side and upon the compartment side of the partition, the feeders or mains may be strung through the conduits on the hall side and taps may be led through the lateral openings and thence through the conduits on the compartment side of the wall to the desired locality.

I will now describe the formation of the ceilings whereby conduits may be provided therein. I have illustrated a typical form of building construction wherein the floor is supported upon beams $e$, held together by means of tie-rods $e'$. I have shown the space between the beams filled with tiles in the usual manner, the plaster of the ceiling being carried directly upon the under faces of these tiles. In addition to the usual tiles $h\ h$, forming the ceiling, I provide specially-formed tiles $k$, provided with channels $k'$ at the lower end to form the conduit. The tile $k$ is shown in detail in Fig. 10, and it will be noted that a cover $k^2$ is provided for the channel $k'$ to form the conduit. These covers $k^2$ may be secured in position by means of the twisted wire, and the plaster of the ceiling may be formed directly over the covers. At the position of a chandelier or bracket an opening $k^3$ may be provided through the cover for the passage of the wires or pipes. The conduit $k'$ thus formed in the ceiling may communicate with the horizontal conduits and also with the vertical conduits, as illustrated. I preferably form the channel for the ceiling-conduit in the tiles which are employed in connection with the tie-rods. It has been the usual practice to employ tiles having the lateral openings, as illustrated in Fig. 3, so that the tile may be placed over the tie-rod after the latter has been placed in position. These tiles are usually narrower than the other tiles, and I preferably provide a channel at the lower end of the tiles of this type to form the conduit for the reception of the conductors or pipes.

When it is not desired to provide the conduit in the ceiling, the construction may be as shown in Fig. 11. This figure also shows a modification of the tiles which form the horizontal conduits in the wall. The tile in this instance is shown as having a single conduit upon each side of the central web.

In Fig. 6 I have shown a modified form of tile in which the conduits are formed upon one side only of the tile. Thus the tile comprises a web $f$, having channels $f'$ $f'$ formed upon one side, a removable cover $f^2$ being provided in connection with the channel.

In Fig. 8 I have illustrated the formation at the corner or bend of a wall. A special tile $l$ is provided at the corner, the same being hollow and communicating with the conduits in the adjoining tiles. A removable cover $l'$ may be provided, or instead of such removable cover a manhole may be placed at the end of the wall.

While I have referred in the above description to building-blocks in the form of tiles, it will be understood that any other type of building-block may be employed and the same may be made of any suitable material. In order to get conduits possessing thorough insulating properties, the blocks may be made of glass or porcelain, as such material will not absorb moisture.

In order to avoid the formation of continuous flues along the line of the conduit to thereby produce a draft in case of fire, the conduit may be blocked at intervals—as, for instance, at each manhole—by means of plaster-of-paris, which may be readily removed when it is desired to remove the wires or pipes or to insert new ones.

Having described my invention, what I claim as new, and desire to secure by Letters Patent, is—

1. A building-wall comprising tiles or blocks having openings forming a continuous conduit or conduits and removable covers of tile associated with said tiles or blocks, substantially as described.

2. A building-wall formed of tiles or building-blocks and comprised in part by specially-formed tiles or blocks having openings therein and laid together to form a continuous conduit or conduits and removable covers for the conduit or conduits associated with the said tiles or blocks, whereby the said conduit or conduits are readily accessible, substantially as described.

3. A building-wall or partition having a layer of specially-formed tiles or blocks extending horizontally to form a continuous conduit or conduits and removable covers associated therewith, whereby access may be readily had to the interior of the conduit or conduits at points between the ends thereof, substantially as described.

4. A wall or partition built of tiles or building-blocks and provided at the upper end beneath the ceiling with a layer of specially-formed tiles or blocks having openings forming a continuous conduit or conduits, extending about the room, and means for obtaining access to the conduit or conduits so formed, substantially as described.

5. A building-wall or partition having a layer of tiles or blocks provided with openings forming a horizontal conduit or conduits at the upper end of the wall near the ceiling and other tiles having openings forming a vertical conduit or conduits communicating with said horizontal conduit or conduits, substantially as described.

6. A building-wall or partition and a ceiling formed of tiles or building-blocks, said wall being provided with tiles having openings forming a continuous vertical conduit or conduits and said ceiling being formed with blocks having openings forming a horizontal conduit or conduits communicating with said vertical conduits, and extending into the room away from the walls thereof, and openings through said ceiling into the conduits, whereby connection may be directly made therewith for chandeliers and the like, substantially as described.

7. A wall or partition and a ceiling formed of tiles or building-blocks, said wall being provided with specially-formed tiles provided with openings forming a continuous horizontal conduit or conduits and a continuous vertical conduit or conduits and said ceiling being provided with specially-formed tiles forming a horizontal conduit or conduits, substantially as described.

8. A building-wall comprising tiles or blocks having openings forming a continuous conduit or conduits, and a manhole or manholes for said conduit or conduits in the tiles or blocks, substantially as described.

9. A building-wall, comprising tiles or blocks having openings forming a continuous conduit or conduits, and removable covers associated with said tiles or blocks to permit ready access to the conduit or conduits, said covers being located beneath and covered by the plaster in the finished wall, substantially as described.

10. A building-wall, comprising tiles or blocks having openings forming a continuous conduit or conduits, and removable covers of tile associated with said tiles or blocks to permit ready access to the conduit or conduits, said covers being located beneath and covered by the plaster in the finished wall, substantially as described.

11. A building-wall, comprising tiles or blocks of the width of the wall and having openings forming a continuous conduit or conduits, and removable covers on either side of the tiles or blocks whereby access may readily be had to said conduit or conduits from either side of the wall substantially as described.

12. A building-wall, comprising tiles or blocks of the width of the wall and having channels on either side to form continuous conduits, and removable covers on either side whereby access may be readily had to the channels on either side, substantially as described.

13. A building-wall, comprising tiles or blocks having partitions dividing the same into longitudinal channels forming continuous conduits, said partitions having openings formed therein whereby access may be had from one channel to another, substantially as described.

14. A building-wall or partition having a layer of tiles or blocks provided with openings forming horizontal conduits, and other tiles having openings forming intersecting vertical conduits, and a tile or block at the intersection of said horizontal and vertical conduits having partitions and openings through its partitions whereby the said conduits intercommunicate, substantially as described.

15. A building-wall or partition having a layer of tiles or blocks provided with openings forming horizontal conduits, and other tiles having openings forming intersecting vertical conduits, a tile or block at the intersection of said conduits having partitions and walls and openings in said partitions and walls whereby the conduits are intercommunicating, and a cover for said intersecting tile whereby access may be readily had to any and all conduits, substantially as described.

16. A building-wall comprising tiles or blocks having openings therein forming a continuous conduit or conduits, said tile having removable portions beneath the plaster whereby access may be had to said conduit or conduits, substantially as described.

17. A building-wall comprising tiles or blocks having openings therein forming a continuous conduit or conduits, said tile having removable portions normally connected therewith beneath the plaster whereby access may be had to said conduit or conduits, substantially as described.

18. A specially-formed tile having openings therethrough adapted to form a conduit or conduits when built into a wall said tile having removable portions whereby access may be readily had to the said conduit or conduits, substantially as described.

19. A specially-formed tile having openings therethrough adapted to form a conduit or conduits when built into a wall, said tile having removable portions normally secured thereto, whereby access may be had to the said conduit or conduits, substantially as described.

20. A specially-formed tile having openings therethrough adapted to form a conduit or conduits, when built into a wall, said tile having removable portions normally secured thereto, said removable portions being exteriorly formed to receive and retain the plaster of the wall, substantially as described.

21. A specially-formed tile having openings therethrough adapted to form a conduit or conduits when built into a wall and having projecting portions formed thereon, whereby when the tile is built into a wall it is interlocked with the other portions thereof, substantially as described.

22. A building-wall comprising tiles or blocks having openings therein forming a continuous conduit or conduits, and manholes located at intervals in said tiles to provide convenient and ready access to the conduit or conduits, substantially as described.

23. A building-wall comprising tiles or blocks having openings therein forming a continuous conduit or conduits, and having covers at intervals placed beneath the plaster, and manholes also located in said tile at intervals throughout the length of the conduit, substantially as described.

24. In a ceiling, the combination with supporting-beams, of tile extending beneath said beams to form the ceiling, tie-rods running between the said beams, specially-formed tile among those constituting the ceiling and having alining openings through which the said tie-rods pass, said tile having their openings or channels forming a continuous conduit for electric conductors, substantially as described.

25. In a ceiling, the combination with supporting-beams, of tile extending between said beams for forming the ceiling, tie-rods running between the said beams, specially-formed tile among those forming the ceiling, and having alining openings or channels forming a continuous conduit for electric conductors, and other specially-formed tile adjacent the beams and having a portion passing beneath the lower edge of the same to form a continuation of said conduit, substantially as described.

26. A building-wall comprising tile of usual form and specially-formed tile, the latter having openings therein forming a continuous conduit or conduits in the wall, and adapted to break joints with the other tile, substantially as described.

27. A building-wall comprising the usual tile and specially-formed tile, the latter having openings therein to form a continuous conduit or conduits, and means for interbonding said special tile with the usual tile, substantially as described.

In witness whereof I have hereunto subscribed my name in the presence of two witnesses.

ALFRED FELLHEIMER.

Witnesses:
W. CLYDE JONES,
M. R. ROCHFORD.